(12) United States Patent
Hu et al.

(10) Patent No.: US 11,892,814 B2
(45) Date of Patent: Feb. 6, 2024

(54) DIAGNOSTIC DEVICE AND MACHINE LEARNING DEVICE

(71) Applicant: FANUC CORPORATION, Yamanashi (JP)

(72) Inventors: Liancheng Hu, Yamanashi (JP); Kazuhiro Satou, Yamanashi (JP); Hiroyasu Asaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 308 days.

(21) Appl. No.: 17/029,038

(22) Filed: Sep. 23, 2020

(65) Prior Publication Data

US 2021/0103267 A1 Apr. 8, 2021

(30) Foreign Application Priority Data

Oct. 8, 2019 (JP) .................................. 2019-185353

(51) Int. Cl.
*G05B 19/4063* (2006.01)
*G06N 20/00* (2019.01)

(52) U.S. Cl.
CPC ......... *G05B 19/4063* (2013.01); *G06N 20/00* (2019.01); *G05B 2219/32222* (2013.01)

(58) Field of Classification Search
None
See application file for complete search history.

(56) References Cited

U.S. PATENT DOCUMENTS

| | | | | |
|---|---|---|---|---|
| 7,684,879 B2* | 3/2010 | Yutkowitz | ............ | G05B 13/042 700/28 |
| 2018/0373221 A1* | 12/2018 | Nakamura | ............ | G05B 19/237 |

FOREIGN PATENT DOCUMENTS

| | | |
|---|---|---|
| JP | H11262932 A | 9/1999 |
| JP | 2013-216030 A | 10/2013 |
| JP | 2019-070580 A | 5/2019 |

OTHER PUBLICATIONS

Tzeng, Kune-Shiang, and Jian-Shiang Chen. "Toward the iterative learning control for belt-driven system using wavelet transformation." Journal of sound and vibration 286.4-5 (2005): 781-798. (Year: 2005).*

* cited by examiner

*Primary Examiner* — Carlos R Ortiz Rodriguez
(74) *Attorney, Agent, or Firm* — HAUPTMAN HAM, LLP (57) ABSTRACT

A diagnostic device is a device for estimating the tension of a belt of an industrial machine for transmitting power, and is provided with a control unit configured to control a diagnostic operation in which the belt is driven, a data acquisition unit configured to acquire at least feedback data at the time of the diagnostic operation, a preprocessing unit configured to analyze frequency-gain characteristics of the feedback data and create, as input data, a range including a resonant frequency and an anti-resonant frequency in the characteristics, and a machine learning device configured to perform processing related to machine learning, based on the data created by the preprocessing unit. The diagnostic device supports inference or abnormality detection of the value of the belt tension.

10 Claims, 4 Drawing Sheets

DIAGNOSTIC DEVICE AND MACHINE LEARNING DEVICE

RELATED APPLICATIONS

The present application claims priority to Japanese Patent Application Number 2019-185353 filed Oct. 8, 2019, the disclosure of which is hereby incorporated by reference herein in its entirety.

BACKGROUND OF THE INVENTION

Field of the Invention

The present invention relates to a diagnostic device and a machine learning device, and more particularly, to a diagnostic device, configured to diagnose the tension of a belt for transmitting power, and a machine learning device.

Description of the Related Art

A diagnostic device for diagnosing the operating states of industrial machines, such as robots, machine tools, and injection molding machines, installed in a production line is introduced in a factory or some other manufacturing site. The diagnostic device monitors the operating states of the industrial machines lest the production line stop and so that the production line can be quickly restored in case it is stopped.

The industrial machines have a mechanism for transmitting the rotating power of a motor to axes through a power transmission unit such as a belt. The belt for use as the power transmission unit will cause a reduction in life if its tension (or tightness) is too low or too high. Moreover, if the tension is inappropriate, it will also result in slipping, tooth skipping, or the like during operation. Therefore, it is to be desired that the level of the belt tightness be kept within a fixed range.

Meanwhile, the belt is liable to aging degradation and its tension changes depending on the method of custody. Moreover, the belt tension changes all the time with changes of usage environments such as room temperatures. Therefore, it is important to perform maintenance and inspection manually or automatically at regular intervals (e.g., Japanese Patent Application Laid-Open No. 11-262932).

In inspecting the belt tension, the rotation of the belt is stopped and the tensile force of the belt is detected by using a tension meter, such as a sonic belt tension meter. If the belt tensile force is inappropriate, it is adjusted to an appropriate value. However, the method of belt tension inspection using the tension meter entails the cost of capital investment for the tension meter. Moreover, the inspection requires the operation of the industrial machines to be completely stopped (or requires the machines to be switched off). Furthermore, the manual inspection requires the industrial machines to be disassembled to expose the belt. Thus, there is also the problem of a reduction in productivity.

Accordingly, there is a demand for a technology that enables a diagnosis of the tension or abnormality of a belt without stopping the operation of industrial machines.

SUMMARY OF THE INVENTION

The present applicant has focused on the fact that the resonant frequency of the feedback gain of a motor for driving a belt changes when the tension of the belt is changed. A diagnostic device according to one aspect of the present invention observes a frequency response, obtained when the motor for driving the belt is caused to perform a sweep operation at a rotational speed (frequency) within a specified range, and creates a learning model having machine-learned the correlation between the result of the observation and the belt tension. The belt tension is inferred by using the created learning model. The value of the inferred tension can be displayed, for example, to notify a user of abnormality of the tension.

The one aspect of the present invention is a diagnostic device configured to infer the tension of a belt of an industrial machine for transmitting power, and includes a control unit configured to control a diagnostic operation in which the belt is driven, a data acquisition unit configured to acquire at least feedback data at the time of the diagnostic operation, a preprocessing unit configured to analyze frequency-gain characteristics of the feedback data and create, as input data, a range including a resonant frequency and an anti-resonant frequency in the characteristics, and a machine learning device configured to perform processing related to machine learning, based on the data created by the preprocessing unit.

Another aspect of the present invention is a machine learning device configured to infer the tension of a belt of an industrial machine for transmitting power, and is designed to analyze frequency-gain characteristics of feedback data acquired at the time of a diagnostic operation in which the belt is driven and perform processing related to machine learning, based on input data representative of a range including a resonant frequency and an anti-resonant frequency in the characteristics.

In the one aspect of the present invention, it is unnecessary to introduce a tension meter. Therefore, the belt tension can be inspected without a large amount of cost. Further, the belt tension can be inspected without completely stopping the running industrial machine. Moreover, the belt tension can be inspected without exposing the belt. Consequently, the productivity of the industrial machine is improved.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiments of the present invention will now be described with reference to the accompanying drawings.

Figure 1:
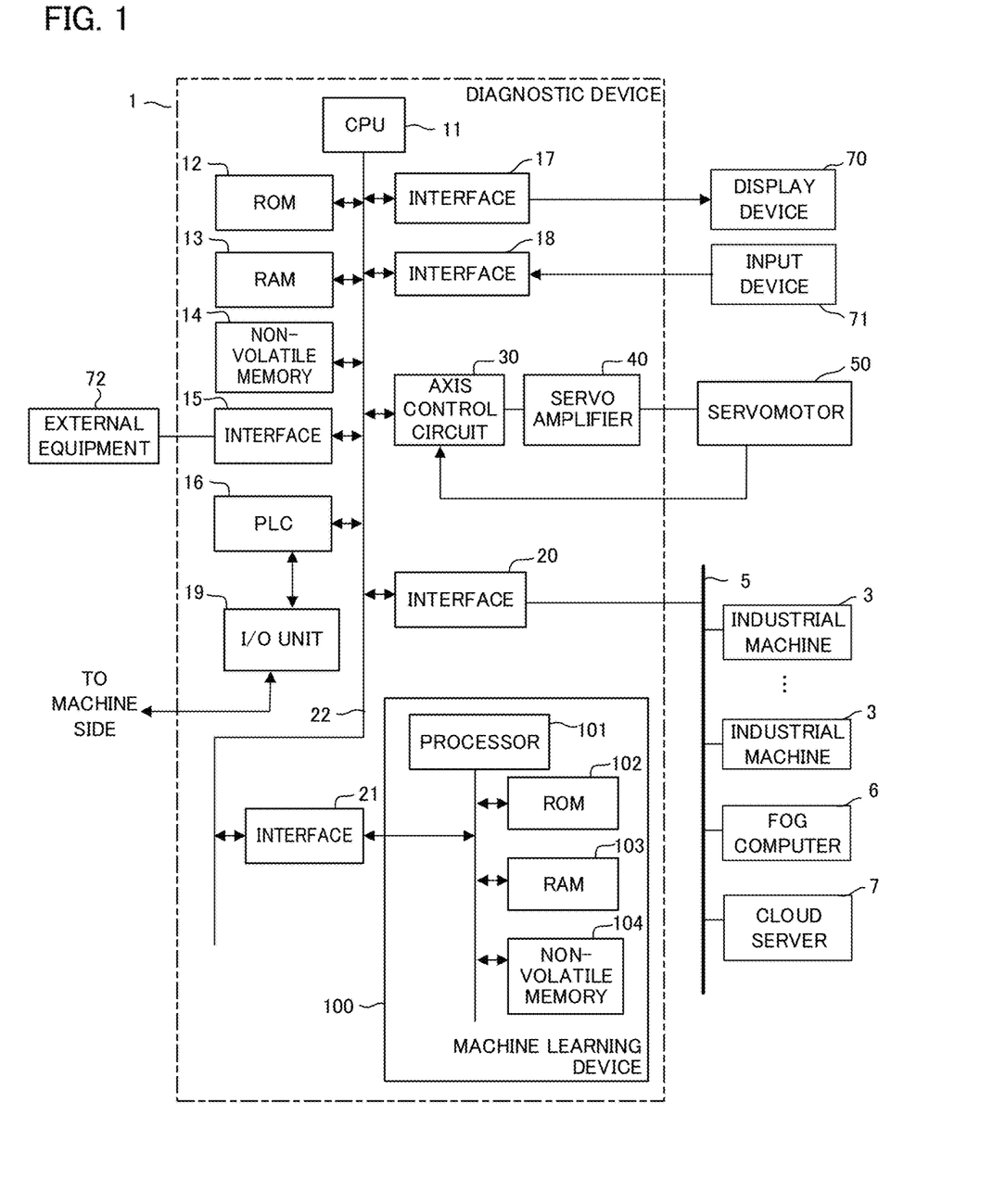
FIG. 1 is a schematic hardware configuration diagram of a diagnostic device according to one embodiment.

FIG. 1 is a schematic hardware configuration diagram showing a diagnostic device according to one embodiment of the present invention. A diagnostic device 1 can be mounted in a control device for controlling industrial machines based on programs for control, for example. Moreover, the diagnostic device 1 can be mounted in a personal computer attached to the control device for controlling the industrial machines based on the programs for control. Furthermore, the diagnostic device 1 can be implemented on a personal computer, cell computer, fog computer 6, or cloud server 7 connected to the control device through a wired/wireless network. In the illustrated example of the present embodiment, the diagnostic device 1 is implemented on the control device for controlling the industrial machines.

A CPU (central processing unit) 11 of the diagnostic device 1 according to the present embodiment is a processor for generally controlling the diagnostic device 1. The CPU 11 reads out a system program stored in a ROM (read only memory) 12 via a bus 20. The CPU 11 controls the entire diagnostic device 1 according to this system program. A RAM (random access memory) 13 is temporarily loaded with temporary calculation data, display data, various externally input data, and the like.

A non-volatile memory 14 is, for example, a memory, SSD (solid state drive), or the like backed up by a battery (not shown). The storage state of the non-volatile memory 14 can be maintained even when the diagnostic device 1 is switched off. The non-volatile memory 14 is stored with programs for control and data input from external equipment 72 through an interface 15. Moreover, the non-volatile memory 14 is stored with programs for control and data input through an input device 71. Furthermore, the non-volatile memory 14 is stored with programs for control, data, and the like acquired from other devices through a network 5. The programs for control and data stored in the non-volatile memory 14 may be loaded in the RAM 13 during execution and use. Moreover, various system programs such as conventional analysis programs are written in advance in the ROM 12.

The interface 15 connects the CPU 11 of the diagnostic device 1 and the external equipment 72, e.g., a USB device. For example, programs for control, setting data, and the like used to control the industrial machines are read from the external equipment 72. Moreover, the programs for control, setting data, and the like edited in the diagnostic device 1 may be designed to be stored in external storage means through the external equipment 72. A PLC (programmable logic controller) 16 executes a ladder program and outputs signals for control to the industrial machines and their peripheral devices (e.g., a tool changer, an actuator such as a robot, sensors such as temperature sensors and humidity sensors attached to the industrial machines) through an I/O unit 19. Moreover, the PLC 16 receives signals from various switches of control panels on the main bodies of the industrial machines, their peripheral devices, and the like, performs necessary signal processing, and then delivers the signals to the CPU 11.

An interface 20 connects the CPU 11 of the diagnostic device 1 and the wired/wireless network 5. The network 5 is connected with other industrial machines 3, the fog computer 6, the cloud server 7, and the like. The diagnostic device 1 exchanges data with these other industrial machines 3, fog computer 6, cloud server 7, and the like.

Data obtained as a result of execution of the data, programs, and the like read onto the memory are input to and displayed on a display device 70. Moreover, data and the like output from a machine learning device 100 (described later) are input through an interface 17 to and displayed on the display device 70. Furthermore, the input device 71, which is composed of a keyboard, pointing device, and the like, delivers commands, data, and the like based on a worker's operation to the CPU 11 through an interface 18.

An axis control circuit 30 for controlling the axes of the industrial machines receives commands indicative of axis movement amounts from the CPU 11 and outputs commands to move the axes to a servo amplifier 40. On receiving these commands, the servo amplifier 40 drives a servomotor 50 for moving the axes of a machine tool. The axis servomotor 50 has a position/speed detector built-in. The servomotor 50 feeds back a position/speed feedback signal from the position/speed detector to the axis control circuit 30. In this way, the axis control circuit 30 performs position/speed feedback control. In the hardware configuration diagram of FIG. 1, the axis control circuit 30, servo amplifier 40, and servomotor 50 are each shown as being only one in number. Actually, however, these elements are provided corresponding in number to the axes of the industrial machine to be controlled. At least one of the servomotors 50 is connected to a predetermined axis of the industrial machine by a belt for use as a power transmission unit.

An interface 21 connects the CPU 11 and the machine learning device 100. The machine learning device 100 includes a processor 101 configured to control the entire machine learning device 100. Moreover, the machine learning device 100 includes a ROM 102 stored with system programs and the like, a RAM 103 for temporary storage in each step of processing related to machine learning, and a non-volatile memory 104 used to store learning models and the like. The machine learning device 100 can observe those pieces of information (e.g., data indicative of the operating states of the servomotors 50, detected values of temperature sensors and humidity sensors (not shown), etc.) which can be acquired by the diagnostic device 1 through the interface 21. Moreover, the diagnostic device 1 acquires results of processing output from the machine learning device 100 through the interface 21. The diagnostic device 1 stores and displays the acquired results and transmits them to other devices through the network 5 or the like.

Figure 2:
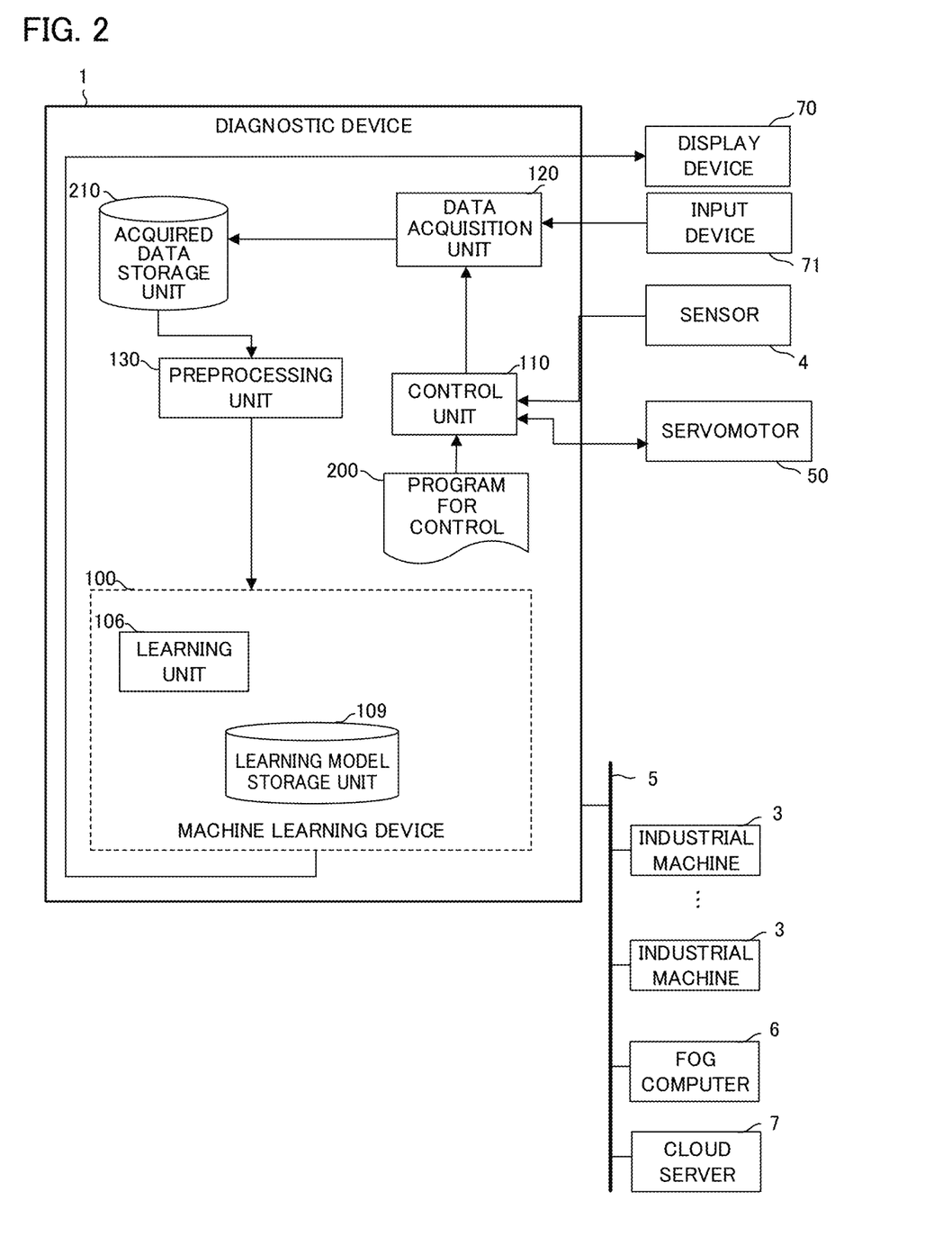
FIG. 2 is a schematic functional block diagram of a diagnostic device according to a first embodiment.

FIG. 2 is a schematic block diagram showing functions of a diagnostic device 1 according to a first embodiment of the present invention. The individual functions of the diagnostic device 1 according to the present embodiment are implemented as the CPU 11 of the diagnostic device 1 shown in FIG. 1 and the processor 101 of the machine learning device 100 execute the system program and control the operations of the individual parts of the diagnostic device 1 and the machine learning device 100. The diagnostic device 1 according to the present invention performs machine learning of the correlation between frequency response data obtained when a sweep operation is carried out at a rotational speed (frequency) within a specified range and a tension value of the belt. The sweep operation is an operation for changing the rotational speed (frequency) of a motor for driving the belt. The sweep operation gradually increases the rotational speed (frequency) of the motor from a predetermined rotational speed (frequency) to a higher predetermined rotational speed (frequency), for example.

The diagnostic device 1 of the present embodiment includes a control unit 110, data acquisition unit 120, and preprocessing unit 130. Moreover, the machine learning device 100 of the diagnostic device 1 includes a learning unit 106. Furthermore, the RAM 13 or the non-volatile memory 14 of the diagnostic device 1 is previously stored with a program for control 200 for controlling the servomotors 50 of the industrial machines. Also, the RAM 13 or the non-volatile memory 14 of the diagnostic device 1 is provided in advance with an acquired data storage unit 210 as an area for storing data acquired by the data acquisition unit 120 from the servomotors 50, a sensor 4, and the like. Moreover, a learning model storage unit 109 as an area for storing learning models created by the learning unit 106 is provided in advance on the RAM 103 or the non-volatile memory 104 of the machine learning device 100.

The control unit 110 is implemented as the CPU 11 of the diagnostic device 1 shown in FIG. 1 executes the system program read out from the ROM 102 and mainly the CPU 11 performs arithmetic processing using the RAM 13 and the non-volatile memory 14, control processing for the individual parts of the industrial machines using the axis control circuit 30 and the PLC 16, and input/output processing through the interface 18. The control unit 110 analyzes the blocks of the program for control 200 and, based on the result of the analysis, controls the individual parts of the industrial machines. If a block of the program for control 200 issues a command to drive the axes of the industrial machines, for example, the control unit 110 generates movement command data according to the command by the block and outputs the data to the servomotors 50. Moreover, if the block of the program for control 200 issues a command to activate a peripheral device such as the sensor 4 attached to the industrial machine, for example, the control unit 110 generates a specified signal for operating the peripheral device and outputs it to the PLC 16. The control unit 110 acquires speed feedback gains of the servomotors 50 and detected value data detected by the sensors 4 including the temperature and humidity sensors and outputs them to the data acquisition unit 120.

The program for control 200 includes a block that issues a command to urge the servomotor 50 for driving the belt to perform the sweep operation at the rotational speed (frequency) within the specified range. Moreover, the program for control 200 includes a block that issues a command to acquire the speed feedback gain of the servomotor 50 currently performing the sweep operation as time-series data. Furthermore, the program for control 200 includes a block that issues a command to acquire detected value data of the sensors 4 at the start of the sweep operation, during the sweep operation, and/or at the end of the sweep operation.

The data acquisition unit 120 is implemented as the CPU 11 of the diagnostic device 1 shown in FIG. 1 executes a system program read out from the ROM 12 and arithmetic processing mainly by the CPU 11 using the RAM 13 and the non-volatile memory 14 is performed. The data acquisition unit 120 acquires the speed feedback gain to be acquired from the servomotor 50 during the operation of the industrial machine and the detected value data detected by the sensors 4 and stores them into the acquired data storage unit 210. The speed feedback gain acquired by the data acquisition unit 120 is time-series data. The detected value data acquired by the data acquisition unit 120 may be a data value to be acquired at a specified timing. Moreover, the data acquisition unit 120 acquires the tension value of the belt at the point in time of the execution of the program for control 200 from the input device 71 by such a means as to urge an operator's input. This belt tension value is measured in advance in the operator's inspection work.

The preprocessing unit 130 is implemented as the CPU 11 of the diagnostic device 1 shown in FIG. 1 executes the system program read out from the ROM 12 and the arithmetic processing mainly by the CPU 11 using the RAM 13 and the non-volatile memory 14 and output processing using an interface 21 are performed. The preprocessing unit 130 creates learning data (training data) to be used for the processing of machine learning by the machine learning device 100, based on the data stored in the data acquisition unit 120. The preprocessing unit 130 outputs the created learning data to the machine learning device 100. The preprocessing unit 130 creates training data including at least input data S, which includes frequency response data indicative of frequency-gain characteristics obtained by a frequency analysis of the speed feedback gain of the servomotor 50 stored in the acquired data storage unit 210, and output data L including the belt tension value.

Figure 3:
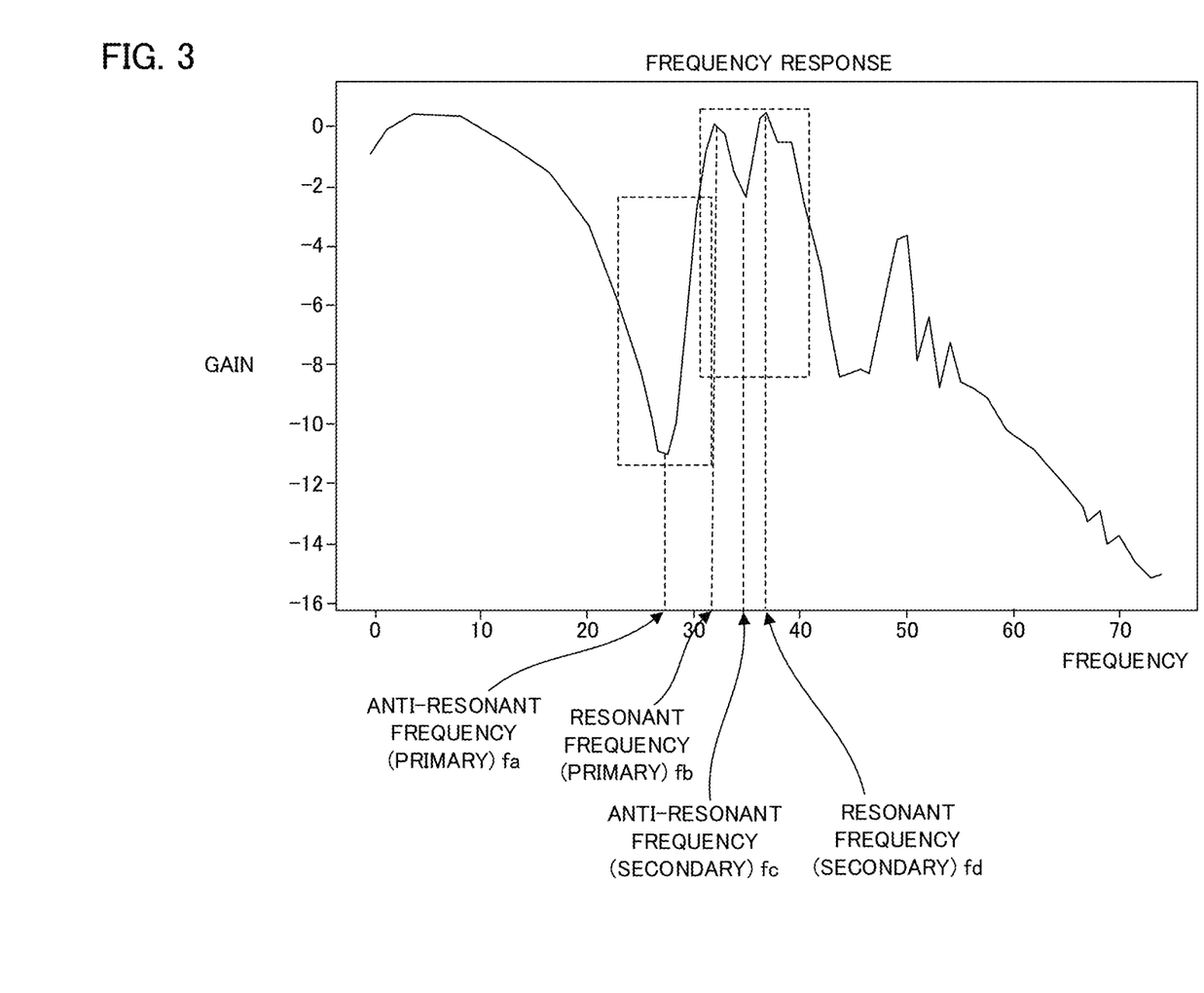
FIG. 3 is a diagram showing an example of frequency response data.

The frequency response data as the input data S may be data obtained by sampling gain values in a frequency band within a specified range with specified frequency cycles. In other words, the input data S may be data obtained by sampling gain values in a specified frequency band. In this case, the frequency response data as the input data S should preferably include a frequency band that includes a primary resonant frequency and a primary anti-resonant frequency in a pair. FIG. 3 is a diagram showing an example of a frequency analysis of the speed feedback gain. In the example of FIG. 3, a peak of the anti-resonant frequency exists in a position fa. Thus, the gain value in the position fa is a local minimum value. Moreover, a peak of the resonant frequency exists in a position fb. Thus, the gain value in the position fb is a local maximum value. The preprocessing unit 130 is expected only to create series data on frequency-gain sets sampled with specified frequency cycles fp as the frequency response data used for the input data S, in a frequency band within a specified range fr around the positions in which these peaks of the resonant and anti-resonant frequencies exist. The frequency response data as the input data S may be designed to further include, in addition to the above data, a range including secondary or higher-degree resonant and anti-resonant frequencies in a pair.

The preprocessing unit according to the present embodiment does not use only the values of the anti-resonant and resonant frequencies for the frequency response data as the input data S but incorporates series data of a frequency band within a specified range around the anti-resonant and resonant frequencies into the input data S. This is done in order to urge the unit to learn the correlation between a resulting waveform and the belt tension value because anti-resonant and resonant points do not appear in a pair but only one of them appears in some cases. The waveform around the anti-resonant and resonant points changes depending on the states of the motor and the belt, and the like. If it is assumed that the anti-resonant and resonant points exist in the vicinity of each other, learning can be precisely performed by using the series data within the specified range as the input data S even in case only one of the anti-resonant and resonant points is apparent.

The learning unit 106 of the machine learning device 100 is implemented as the processor 101 of the machine learning device 100 shown in FIG. 1 executes the system program read out from the ROM 102 and the arithmetic processing mainly by the processor 101 using the RAM 103 and the non-volatile memory 104 is performed. The learning unit 106 creates a learning model by performing the machine learning using the learning data (training data) created by the preprocessing unit 130. The learning unit 106 causes the learning model storage unit 109 to store the created learning model. The machine learning performed by the learning unit 106 is conventional supervised learning. The learning model created by the learning unit 106 can be assumed to have learned the correlation of the belt tension value as the label data L with the frequency response data as the input data S. A multilayer perceptron, recurrent neural network, Long Short-Term Memory, convolutional neural network, and the like can be given as examples of the learning model created by the learning unit 106.

Moreover, the learning model may be designed so as to infer the belt tension using machine learning such as a regression analysis, multiple regression analysis, and ridge regression, based on some feature points including the resonant frequency and the anti-resonant frequency, out of the frequency response data, as the input data S and the belt tension value as the label data L. The learning model based on regression is advantageous in that its structure is simple and the processor 101 cannot easily be loaded. On the other hand, the learning model based on deep learning, such as the convolutional neural network, enjoys an increased precision of belt tension inference.

The diagnostic device 1 according to the present embodiment generates a learning model having learned the correlation between the frequency response data obtained when the sweep operation is performed at the rotational speed (frequency) within the specified range and the belt tension value. The worker sets different belt tensions in advance. The learning unit 106 acquires frequency response data obtained when the sweep operation is performed at the rotational speed (frequency) within the specified range with the individual belt tension values and creates a learning model using the acquired data.

The created learning model can be used for an inference unit according to a second embodiment (described later) to infer the current belt tension value.

As one modification of the diagnostic device 1 according to the present embodiment, the preprocessing unit 130 may be designed to further incorporate temperature data and humidity data as the detected value data into the input data S. The temperature and humidity of the environment in which the belt is driven influences the belt tension. Therefore, the precision of the learning of the belt tension value can be improved by incorporating the temperature and humidity data as the detected value data into the input data S.

As another modification of the diagnostic device 1 according to the present embodiment, the preprocessing unit 130 may be designed to incorporate data on mechanical properties (motor specifications, pulley ratios, spans (intervals between pulley shafts), movable part weights, etc.) of the industrial machines, set in advance in the diagnostic device, into the input data S. In some cases, mechanical properties related to the motor for driving the belt may influence the belt tension. Therefore, the precision of the learning of the belt tension value can be improved by incorporating the data related to the mechanical properties into the input data S.

As another modification of the diagnostic device 1 according to the present embodiment, the preprocessing unit 130 may be designed to incorporate data on belt properties (belt shape, physical properties of materials, etc.), set in advance in the diagnostic device, into the input data S. The belt properties influence the belt tension. Therefore, the precision of the learning of the belt tension value can be improved by incorporating the data related to the belt properties into the input data S.

Figure 4:
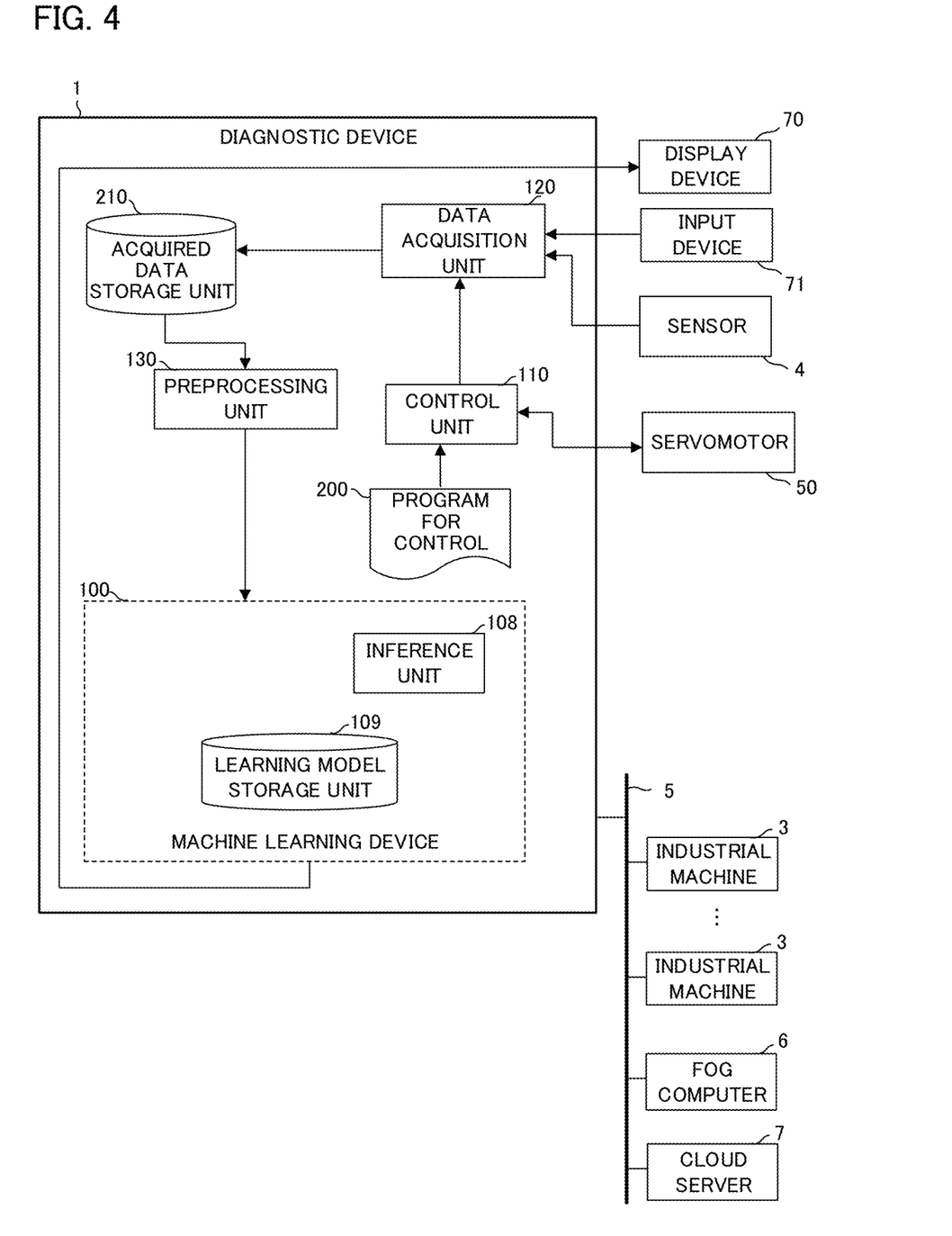
FIG. 4 is a schematic functional block diagram of a diagnostic device according to a second embodiment.

FIG. 4 is a schematic block diagram showing functions of a diagnostic device 1 according to the second embodiment of the present invention. The individual functions of the diagnostic device 1 according to the present embodiment are implemented as the CPU 11 of the diagnostic device 1 shown in FIG. 1 and the processor 101 of the machine learning device 100 execute the system program and control the operations of the individual parts of the diagnostic device 1 and the machine learning device 100. The diagnostic device 1 according to the present invention infers the tension value of a belt of an industrial machine by using a learning model having learned the correlation between frequency response data obtained when a sweep operation is carried out at a rotational speed (frequency) within a specified range and the belt tension value.

The diagnostic device 1 of the present embodiment includes a control unit 110, data acquisition unit 120, and preprocessing unit 130. Moreover, the machine learning device 100 of the diagnostic device 1 includes an inference unit 108. Furthermore, the RAM 13 or the non-volatile memory 14 of the diagnostic device 1 is previously stored with a program for control 200 for controlling the servomotors 50 of the industrial machines. Also, the RAM 13 or the non-volatile memory 14 of the diagnostic device 1 is provided in advance with an acquired data storage unit 210 as an area for storing data acquired by the data acquisition unit 120 from the servomotors 50, a sensor 4, and the like. Moreover, a learning model storage unit 109 as an area stored with learning models created by the learning unit 106 according to the first embodiment is provided in advance on the RAM 103 or the non-volatile memory 104 of the machine learning device 100.

The control unit 110 according to the present embodiment shares the similar functions with the control unit 110 according to the first embodiment.

The data acquisition unit 120 according to the present embodiment acquires the speed feedback gain to be acquired from the servomotor 50 during the operation of the industrial machine and the detected value data detected by the sensors 4 and stores them into the acquired data storage unit 210. The speed feedback gain acquired by the data acquisition unit 120 is time-series data. The detected value data acquired by the data acquisition unit 120 may be a data value to be acquired at a specified timing.

The preprocessing unit 130 according to the present embodiment creates data for inference to be used for the processing of machine learning by the machine learning device 100, based on the data stored in the data acquisition unit 120. The preprocessing unit 130 outputs the created data for inference to the machine learning device 100. The preprocessing unit 130 creates data for inference including at least input data S, which includes frequency response data indicative of frequency-gain characteristics obtained by a frequency analysis of the speed feedback gain of the servomotor 50 stored in the acquired data storage unit 210. The frequency response data is created by the same method as that described in connection with the first embodiment.

The inference unit 108 of the machine learning device 100 is implemented as the processor 101 of the machine learning device 100 shown in FIG. 1 executes the system program read out from the ROM 102 and the arithmetic processing mainly by the processor 101 using the RAM 103 and the non-volatile memory 104 is performed. The inference unit 108 performs inference processing for the belt tension value using the learning model stored in the learning model storage unit 109, based on the data for inference created by the preprocessing unit 130. The inference unit 108 outputs the result of the inference processing. The inference processing performed by the inference unit 108 is inference processing that uses a learning model created by conventional supervised learning. For example, if the learning model stored in the learning model storage unit 109 is created as a convolutional neural network, the inference unit 108 inputs the data for inference created by the preprocessing unit 130 to the neural network and outputs the resulting output or an inferred belt tension value, as a result of inference.

The belt tension value as the result of the inference by the inference unit 108 may be output to, for example, a display device 70. Moreover, the belt tension value as the result of the inference may be transmitted to a personal computer, such as a monitoring terminal, a fog computer 6, and a cloud server 7 through a network 5. Furthermore, if the belt tension value as the result of the inference is outside a predetermined specified range, an alert may be output to the effect that the belt tension is found to be abnormal.

The diagnostic device 1 according to the present embodiment having the structure described above infers the tension of a belt of an industrial machine, based on the frequency response data obtained when the sweep operation of a motor such as the servomotor 50 is performed at the rotational (frequency) within the specified range. The diagnostic device 1 can perform specified output processing based on the result of this inference. This inference processing can be performed by only executing the program for control 200 for diagnosis. Therefore, a worker need neither completely stop the industrial machine nor perform complicated work to disassemble the industrial machine to expose the belt, for example. Thus, the productivity of the industrial machine can be expected to be improved.

As one modification of the diagnostic device 1 according to the present embodiment, the preprocessing unit 130 may be designed to further incorporate temperature data and humidity data as the detected value data into the input data S. The temperature and humidity of the environment in which the belt is driven influences the belt tension. Therefore, the precision of the inference of the belt tension value can be improved by incorporating the temperature and humidity data as the detected value data into the input data S.

As another modification of the diagnostic device 1 according to the present embodiment, the preprocessing unit 130 may be designed to incorporate data on mechanical properties (motor specifications, pulley ratios, spans, movable part weights, etc.) of the industrial machines, set in advance in the diagnostic device, into the input data S. In some cases, mechanical properties related to the motor for driving the belt may influence the belt tension. Therefore, the precision of the inference of the belt tension value can be improved by incorporating the data related to the mechanical properties into the input data S.

As another modification of the diagnostic device 1 according to the present embodiment, the preprocessing unit 130 may be designed to incorporate data on belt properties (belt shape, physical properties of materials, etc.), set in advance in the diagnostic device, into the input data S. The belt properties influence the belt tension. Therefore, the precision of the inference of the belt tension value can be improved by incorporating the data related to the belt properties into the input data S.

While embodiments of the present invention have been described above, the invention is not limited to the examples of the above-described embodiments and may be suitably modified and embodied in various forms.

The invention claimed is:

1. A diagnostic device configured to infer or detect abnormality of the tension of a belt of an industrial machine for transmitting power, the diagnostic device comprising:
   a control unit configured to control a diagnostic operation in which the belt is driven;
   a data acquisition unit configured to acquire at least feedback data at the time of the diagnostic operation;
   a preprocessing unit configured to analyze frequency-gain characteristics of the feedback data and create, as input data, a range including a resonant frequency and an anti-resonant frequency in the frequency-gain characteristics; and
   a machine learning device configured to perform processing related to machine learning, based on the data created by the preprocessing unit.

2. The diagnostic device according to claim 1, wherein the data acquisition unit further acquires a tension value of the belt at the time of the diagnostic operation, the preprocessing unit creates training data, which includes the input data and label data including the belt tension value acquired by the data acquisition unit, and the machine learning device includes a learning unit configured to create a learning model having machine-learned the correlation of the belt tension value with the frequency-gain characteristics of the feedback data acquired at the time of the diagnostic operation, based on the training data, and a learning model storage unit configured to store the learning model.

3. The diagnostic device according to claim 1, wherein the machine learning device further includes a learning model storage unit configured to store a learning model having machine-learned the correlation of the belt tension value with the frequency-gain characteristics of the feedback data acquired at the time of the diagnostic operation and an inference unit configured to infer the belt tension value using the learning model stored in the learning model storage unit, based on the input data, and output the inference processing.

4. The diagnostic device according to claim 1, wherein the range including the resonant frequency and the anti-resonant frequency is a range including at least a primary resonant frequency and a primary anti-resonant frequency.

5. The diagnostic device according to claim 4, wherein the range including the resonant frequency and the anti-resonant frequency further includes a range including secondary or higher-degree resonant and anti-resonant frequencies.

6. The diagnostic device according to claim 1, wherein the input data further includes at least one of a temperature or a humidity.

7. The diagnostic device according to claim 1, wherein the input data further includes at least one of a mechanical property or a belt property.

8. A machine learning device configured to infer or detect abnormality of a tension of a belt of an industrial machine for transmitting power, the machine learning device comprising:
   a non-transitory computer readable medium storing a computer program; and
   a processor configured to execute the computer program to
      analyze frequency-gain characteristics of feedback data acquired at a time of a diagnostic operation in which the belt is driven, and
      perform processing related to machine learning, based on input data representative of a range including a resonant frequency and an anti-resonant frequency in the frequency-gain characteristics.

9. The machine learning device according to claim 8, wherein
   the processor is configured to execute the computer program to create a learning model having machine-learned a correlation of a belt tension value with the frequency-gain characteristics of the feedback data acquired at the time of the diagnostic operation, based on training data, which includes the input data and label data including the belt tension value at the time of the diagnostic operation, and the non-transitory computer readable medium is configured to store the learning model.

10. The machine learning device according to claim 8, wherein
the non-transitory computer readable medium is configured to store a learning model having machine-learned a correlation of a belt tension value with the frequency-gain characteristics of the feedback data acquired at the time of the diagnostic operation, and
the processor is configured to execute the computer program to infer the belt tension value using the learning model stored in the non-transitory computer readable medium, based on the input data, and output an inference processing.

* * * * *